M. C. BERSTED.
CARRIER ATTACHMENT FOR AUTOMOBILE RUNNING BOARDS.
APPLICATION FILED JAN. 26, 1920.
1,433,773.  Patented Oct. 31, 1922.
3 SHEETS—SHEET 1.
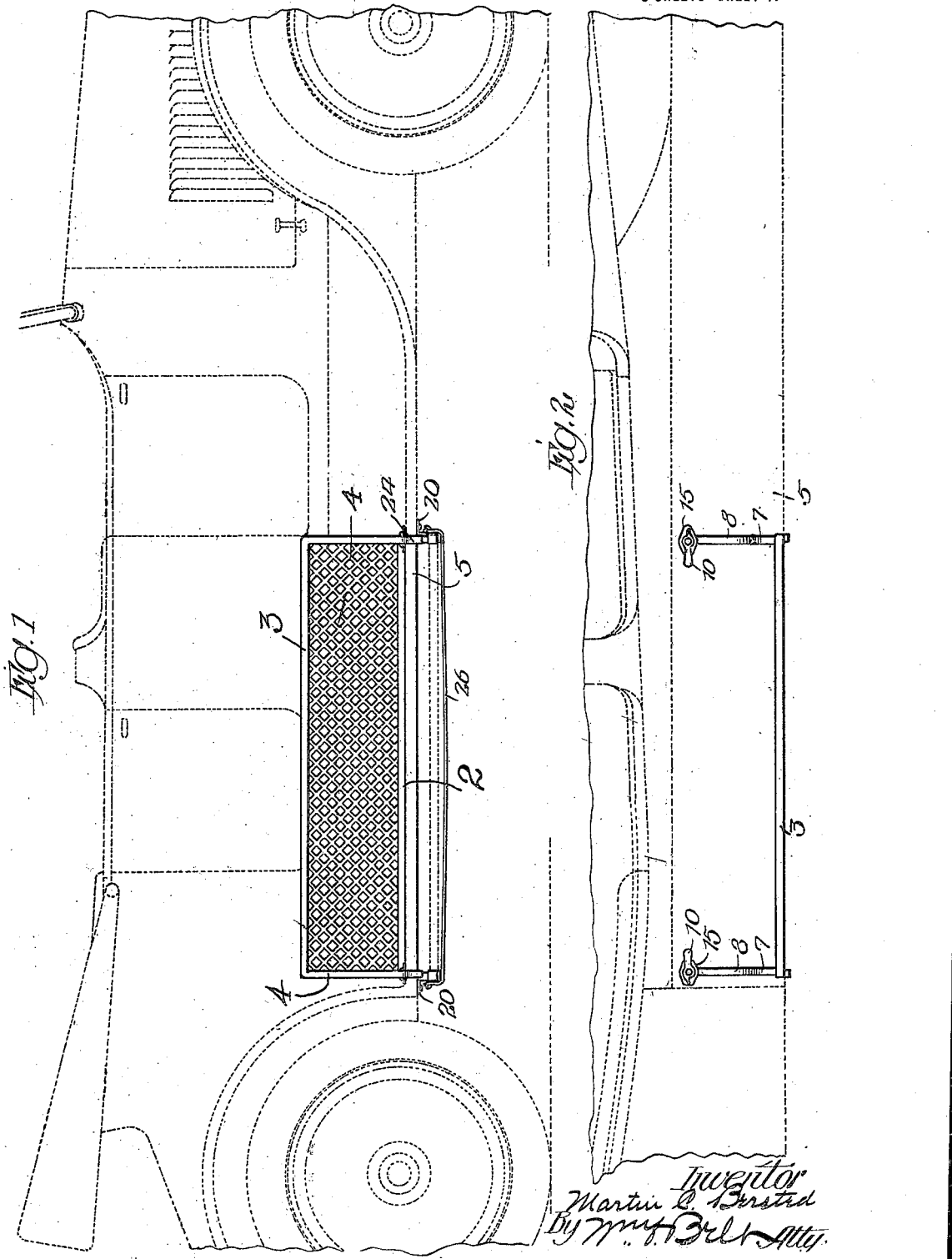

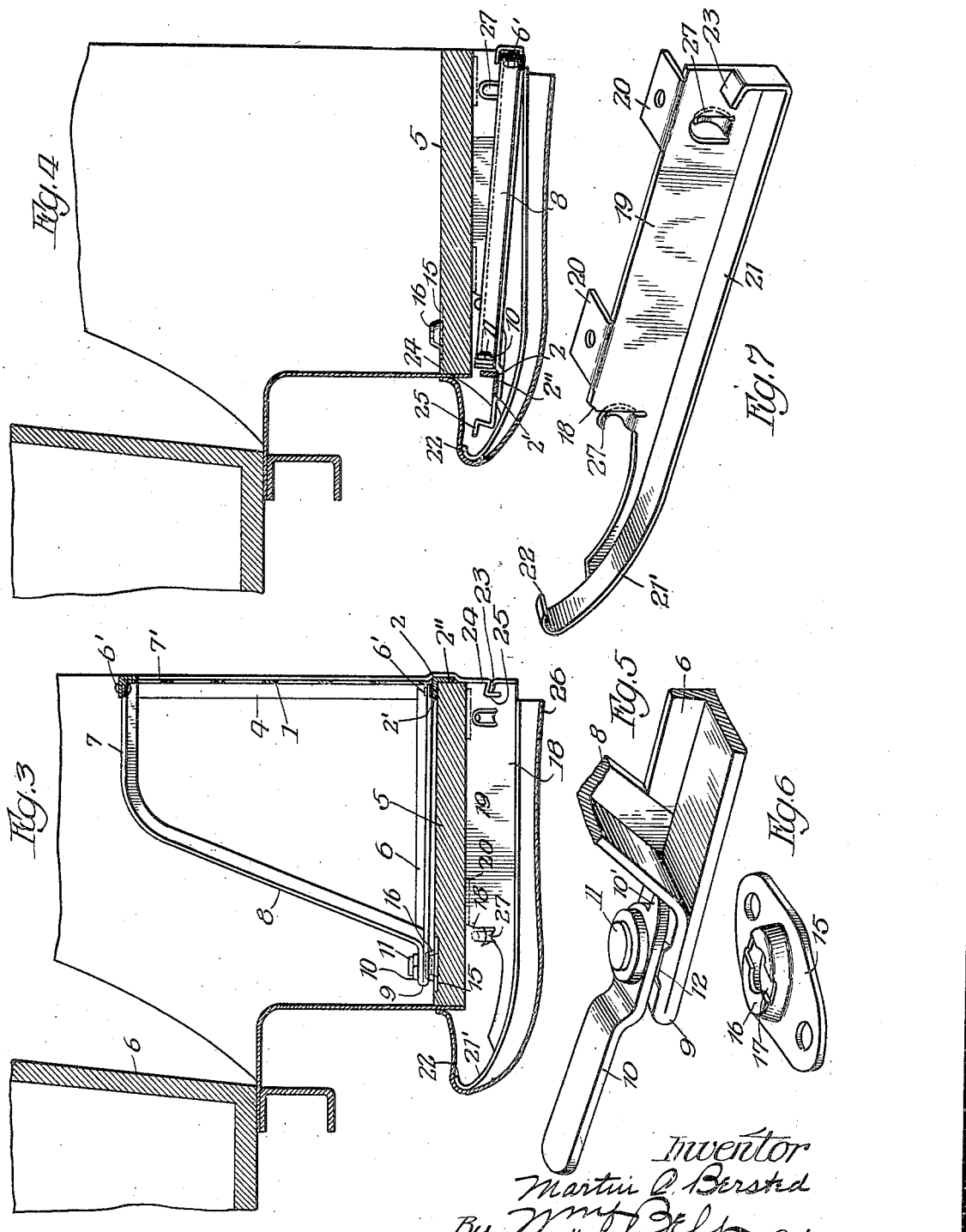

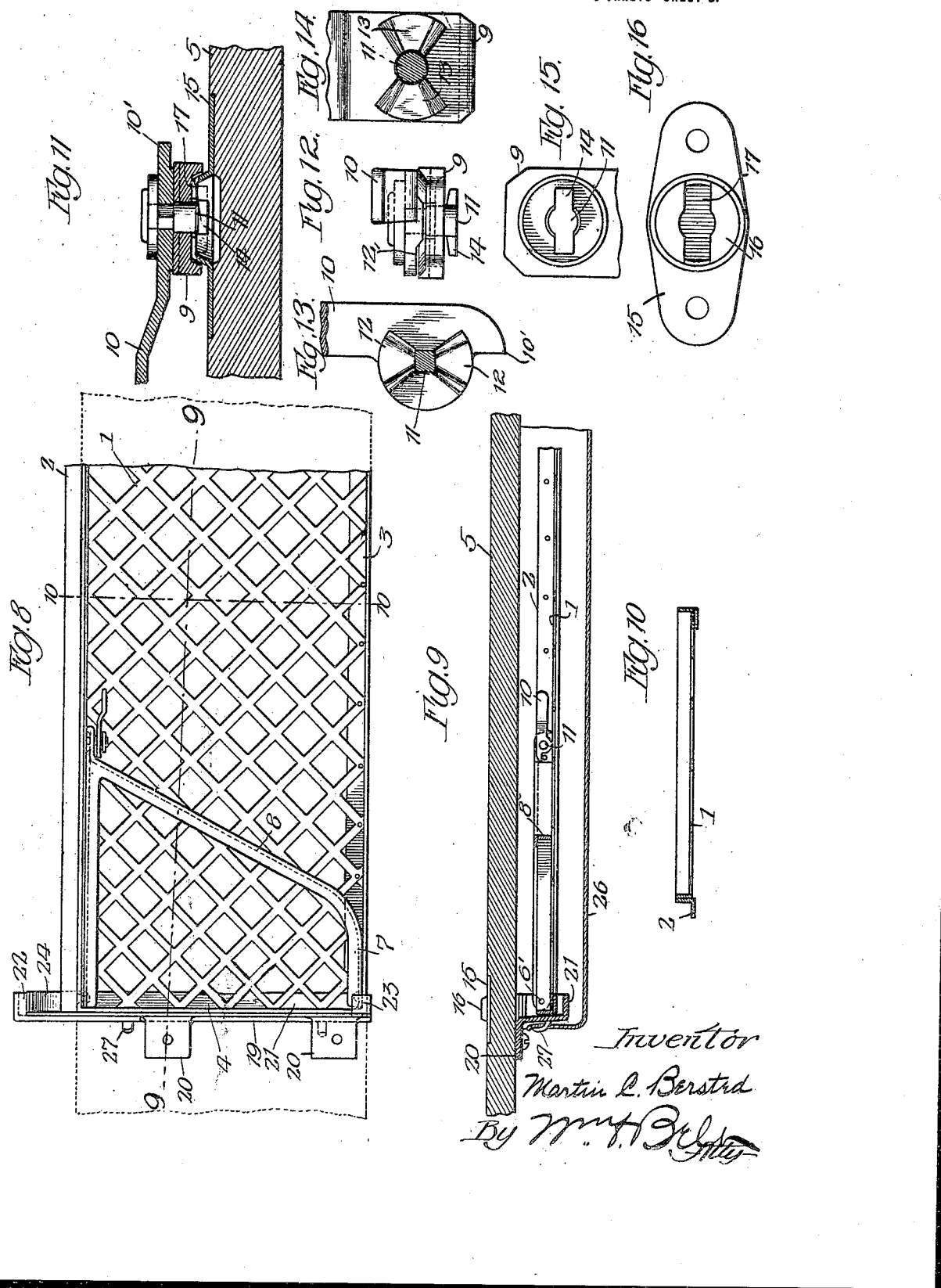

Patented Oct. 31, 1922.

1,433,773

UNITED STATES PATENT OFFICE.

MARTIN C. BERSTED, OF CHICAGO, ILLINOIS.

CARRIER ATTACHMENT FOR AUTOMOBILE RUNNING BOARDS.

Application filed January 26, 1920. Serial No. 354,092.

*To all whom it may concern:*

Be it known that I, MARTIN C. BERSTED, a citizen of the United States, residing at Chicago, in the county of Cook and State of Illinois, have invented certain new and useful Improvements in Carrier Attachments for Automobile Running Boards, of which the following is a specification.

This invention refers to carrier attachments adapted to be mounted on the running board of an automobile to enable luggage, packages, etc. to be carried with safety and without damaging the body of the automobile.

The primary object of the invention is to provide an attachment which can be readily installed in operative position and as readily shifted to inoperative position beneath the running board; and further objects are to provide simple means for rigidly securing the attachment in operative position upon the running board and for supporting the attachment close to the under side of the running board safely and securely but so that it can be quickly adjusted into operative position.

In the accompanying drawings—

Fig. 1 illustrates the invention in operative position on the running board of an automobile.

Fig. 2 is a top plan view showing a portion of the automobile with the invention in operative position thereon.

Fig. 3 is a transverse sectional view showing the attachment in operative position.

Fig. 4 is a similar view showing the attachment in stored position.

Fig. 5 is a perspective view, partly in section, showing one end of the brace and the locking lever.

Fig. 6 is a perspective view of the locking plate.

Fig. 7 is a perspective view of one of the supporting brackets.

Fig. 8 is a top plan view of a portion of the attachment in stored position beneath the running board.

Fig. 9 is a longitudinal sectional view through the middle of Fig. 8.

Fig. 10 is a transverse sectional view on the line 10—10 of Fig. 8.

Fig. 11 is a sectional view of the locking device.

Fig. 12 is a detail elevation of the locking device.

Figs. 13 and 14 are detail sectional views of the locking device.

Fig. 15 is a bottom plan view of the locking device.

Fig. 16 is a top plan view of the locking plate.

Referring to the drawings, the attachment comprises a carrier frame which consists of a strip of reticulated metal 1 mounted in a suitable frame formed of the bottom angle bar 2, top angle bar 3 and end angle bars 4, 4. The bottom angle bar 2 is adapted to engage the upper outer edge of the running board 5 of the automobile 6, its upper flange 2' resting upon the top of the running board and its vertical flange 2" engaging the outer edge of the running board (Fig. 3). By this construction the carrier frame is supported throughout its length upon the running board, being seated upon and against the upper outer corner thereof, whereby the frame is at all times properly positioned and supported in place.

At each end of the carrier frame there is a brace which may be made of an angle bar bent to form a bottom member 6, a top member 7 and a diagonal connecting member 8, the bottom and top members being pivotally connected at 6', 7' respectively to the bottom bar 2 and top bar 3 of the frame so that the braces may be swung inwardly and down upon the reticulated metal 1 within the bars forming the frame therefor. I prefer to make the bars forming the carrier frame and the braces of angle iron for strength, but for some purposes it may be desirable to employ bars of other kinds or sections.

At the juncture of the bottom member 6 and the diagonal member 8 of each brace I prefer to bend the metal upon itself or otherwise form a projection 9 beyond the diagonal member to support the locking lever 10 which is rigidly mounted upon a pin 11 loosely supported in the projection 9. This locking lever has oppositely disposed cam surfaces 12 on its under side which operatively engage cam surfaces 13, 13 on projection 9. The inner end of the pin 11 is provided with a locking head 14 which is adapted to engage a locking plate 15 fastened to the top of the running board adjacent the inner edge thereof. This plate has a socket portion 16 provided with a slot 17 through which the locking head 14 is adapted to enter the socket. When the lever 10 is turned, the cams thereon ride up on the cams 13, 13 and the locking head is turned transversely of the slot and frictionally engaged with the brace in socket 16 to clamp and hold the brace in place. A lug 10' on the lever is arranged to engage the diagonal member 8 of the brace and limit the movement of the lever so that the locking head will be arranged transverse of the slot 17 and tightly engaged with the socket 16. The only parts of the attachment permanently fastened to the top of the running board are the locking plates 15. These form no obstruction to the free use of the running board because they are almost flush with the top thereof and are located adjacent the inner edge of the running board.

On the under side of the running board I fasten two suspension brackets 18, 18 suitably spaced apart to receive and support the ends of the carrier frame. These brackets are made right and left and each comprises an upright member 19 having lugs 20 to receive the fastening devices, by which the bracket is secured to the under side of the running board (Fig. 7). A flange 21 projects laterally from the upright member 19 and is curved upwardly at 21' at its forward end and provided with a hook 22 at its extreme forward end. The rear end of the flange 21 is bent upwardly and forwardly to form a hook 23 which also acts as a support for the downward extensions 24 at the lower corners of the carrier frame. These extensions may be integral with the end bars of the carrier frame and they are preferably provided with hooks 25 at their lower ends to interengage with the hooks 23. The brackets are constructed of a size and shape to receive and hold the carrier frame snugly adjacent the bottom of the running board and the hooks 23 are located sufficiently below the running board to permit the passage of the carrier frame from operative position (Fig. 3) to stored position (Fig. 4) without necessitating any adjustment or movement of any parts other than the carrier frame itself. Brackets are preferably made with the members 19 slightly inclined inwardly at the bottom thereof to snugly engage the ends of the carrier frame and prevent it from rattling when the automobile is in use. The curved forward parts of the flanges 21 support the carrier frame in a slightly tilted or inclined position in storage so that the rear, upper edge of the frame will be engaged with the hooks 23 and thereby the carrier frame is prevented from jolting or slipping out of the brackets in the travel of the automobile. The hooks 22 at the forward ends of the brackets also assist in retaining the carrier frame in storage position.

To protect the carrier frame from dirt and mud I provide a cover 26 of rubber cloth or other suitable material which is engaged with hooks 27 on the brackets. This cover does not in any way interfere with the carrier frame while it is being moved into or out of storage position.

In practice the carrier frame with the brackets folded thereon may be carried in storage position as shown in Fig. 4 resting freely upon the brackets but snugly held thereby so that it will not rattle or jolt free from the brackets in the travel of the automobile. To adjust the carrier frame to operative position as shown in Fig. 3, the frame is pushed forward in the brackets until its rear upper edge is clear of the hooks 23; then the frame is lifted until it can be pulled outward above the hooks 23 and shifted to an upright position with the lower angle bar engaging the upper, outer edge of the running board. The hooks 25 on the carrier frame then engage the hooks 23 on the brackets to prevent entire disengagement of the carrier frame from the brackets. These hooks 23 and 25 act as guides to limit the movement of the carrier frame when it is withdrawn from storage position, the hooks 25 rest upon the hooks 23 when the carrier frame is in operative position and the hooks 23 retain the carrier frame in storage position. After the carrier frame is adjusted in upright position on the running board the braces are properly adjusted transversely of the running board and the heads 14 of the locking pins are inserted in the slot 17. Then the locking levers are turned to turn the heads transversely of the slots and to pull the heads tightly against the sockets whereby the braces are frictionally locked to the running board, and hold the carrier frame in rigid, upright fixed position.

My invention provides an attachment which can be readily applied to an automobile running board and embodies a carrier frame which can be easily and rigidly mounted in operative position at the outer edge of the running board and which can be readily moved to storage position beneath the running board. Storing the carrier frame under the running board is a great convenience and presents many advantages over those carrier frames which have been wholly disconnected from the running board and stored, folded or extended, in the automobile. It is not necessary to disengage my carrier frame from the running board at any time, and hence the liability of losing it or misplacing it is entirely avoided.

I am aware that changes in the form and proportion of parts and in the details of construction of my invention may be made without departing from the spirit or sacrificing the advantages thereof, and I reserve the right to make all such changes as fairly fall within the scope of the following claims:

I claim:

1. The combination with the running board of an automobile, of a carrier attachment comprising a frame, means for securing the frame in upright position at the outer edge of the running board, and spaced brackets fastened rigidly to the underside of the running board and having oppositely disposed flanges curved upwardly at their inner ends adjacent the inner edge of the running board to support the frame in inclined position in storage beneath the running board with its top edge lowermost and engaged with the outer ends of the brackets adjacent the outer edge of the running board.

2. The combination with the running board of an automobile, of locking plates fastened to the running board and provided with recesses, a carrier frame, braces engaged with the frame at the ends thereof, and clamping means carried by said braces and engaging in said recesses to secure the frame in upright position on the running board.

3. The combination with the running board of an automobile, of a locking plate fastened to the running board and provided with a recess, a carrier frame, a brace pivotally connected with the end of said frame, and cam means on said brace adapted to engage said recess to clamp said brace to the running board.

4. The combination with the running board of an automobile, of a locking plate fastened to the running board and having a slotted socket therein, a carrier frame, a brace on the frame, a projection pivotally mounted on the brace and adapted to enter said slot, and means to turn said projection when in said slot, said projection being adapted, when so turned, to engage said socket to lock the brace in fixed position and hold the frame in upright position on the running board.

5. In an automobile running board carrier, a main frame including spaced horizontal top and bottom elements, brace elements for said frame each consisting of an angle having one end pivoted to said bottom element and its adjacent portion extending in a plane at right angles to the plane of said frame, doubled on itself to form an attaching seat, and the remainder of the angle extending from said seat to said top element and pivoted thereto.

6. The combination with the running board of an automobile, of a carrier attachment comprising a frame adapted to be supported in upright position on the running board adjacent the outer edge thereof, and brackets fastened rigidly to the under side of the running board for supporting said frame in storage position, said brackets having oppositely directed flanges at the lower edges thereof and said flanges extending part way up the outer ends of the brackets and turned inwardly to form hooks to engage the top edge of the frame to retain the latter in storage position, and said frame having extensions to engage said hooks when the frame is supported in upright position.

7. The combination with the running board of an automobile, of brackets suspended beneath said board and having opposed shelf like portions, upward projections on the ends of said portions terminating at points spaced below the outer edge of said board, and a carrier device including a frame adapted to be supported upon the outer edge of said board and to extend below same and engage said projections to prevent outward movement of the device, said device being adapted to swing outwardly and downwardly and to be slid between said projections and the running board into storage position upon said shelf-like portions and to be retained thereon by said projections.

8. The combination with the running board of an automobile, a locking plate carried by said running board and having a recess therein, a carrier frame, a brace connected with the carrier frame, a pin carried by said brace and having a head for engagement with said recess and cams for giving said head a binding movement upon rotation of said pin.

MARTIN C. BERSTED.